SYNTHETIC MONOLITHIC FERRITE ARRAY

Filed June 12, 1967

2 Sheets-Sheet 1

INVENTOR
GEORGE B. STRAWBRIDGE

BY Thomas J. Nikolai
ATTORNEY

SYNTHETIC MONOLITHIC FERRITE ARRAY

Filed June 12, 1967 2 Sheets-Sheet 2

INVENTOR
GEORGE B. STRAWBRIDGE
BY Thomas J. Nikolai
ATTORNEY 3,506,976
SYNTHETIC MONOLITHIC FERRITE ARRAY George B. Strawbridge, St. Paul, Minn., assignor to Sperry Rand Corporation, New York, N.Y., a corporation of Delaware Filed June 12, 1967, Ser. No. 645,350
Int. Cl. G11c *5/02, 5/08*
U.S. Cl. 340—174 9 Claims

ABSTRACT OF THE DISCLOSURE

A magnetizable memory array and method of assembling thereof utilizing discrete toroidal cores as the memory elements which are formed into a compact assembly. The cores are formed in strips of planar aligned cores that are aligned in contact along their colinear diameters. Adjacent strip's aligned contiguously along the strips, opposing planar surfaces, are shifted one-half core outside diameter whereby there is formed a two-dimensional array of toroidal cores, the inside diameters of which form diagonal core stringing channels therethrough.

BACKGROUND OF THE INVENTION

This invention in its preferred embodiment relates to the utilization of toroidal cores of magnetizable material as logical memory elements in an electronic data processing system. The value of the use of such memory elements is based upon the bistable characteristics of magnetizable cores which characteristics include the ability to retain, or remember, remanent magnetic conditions that may be utilized to indicate a binary "1" or a binary "0." These memory elements are generally in the form of toroidal ferrite cores and are generally arranged in two-dimensional arrays along a plurality of orthogonally arranged rows and columns with a separate core at each row-column intersection. Drive lines are threaded through the central apertures of the toroidal cores along the rows and columns and terminate at suitable terminals on a core array supporting frame. The threading of the drive lines through the central apertures of the toroidal cores, commonly referred to as "core stringing," requires the use of a tooling fixture termed a "core nest" that provides a tooling function for maintaining the alignment of the toroidal cores during the core stringing operation. A typical arrangement for the organization of such toroidal ferrite cores in two-and-three dimensional arrays is exemplified by the patent to L. Crown et al., Patent No. 3,139,610.

These prior art arrangements for the organization of toroidal ferrite cores in two-dimensional arrays that may be utilized in data processing systems have required the utilization of inordinately large volumes compared to the size of the individual cores per se. Many efforts have been directed toward the improvement of the volumetric efficiency of memory systems utilizing toroidal ferrite cores. Such research has been directed toward multi-aperture devices such as ferrite plates. Such arrangements may be exemplified by the patent to J. Rajchman, Patent No. 3,110,886 or the patent to J. Eggenberger, Patent No. 3,070,782. However, due to the increased manufacturing and handling costs and adjoining aperture flux crossing such multi-aperture devices have not approached the economic and operational advantage of toroidal ferrite cores.

SUMMARY OF THE INVENTION

The present invention is directed toward the use of toroidal ferrite cores in a compact assembly not heretofore realized. In the preferred embodiment of the present invention the cores are formed in groups of planar aligned cores that are aligned along their colinear diameters. A plurality of such strips of planar aligned cores are assembled in contiguous coplanar arrays whereby adjacent strips of cores are shifted one half the cores' outside diameter. This arrangement provides a two-dimensional array of toroidal ferrite cores, the inside diameters, or central apertures, of which form continuous diagonal core stringing channels therethrough. Thus, there is provided an arrangement of toroidal ferrite cores whose volumetric efficiency is only limited by the cores' physical dimensions, and is no way effected by mounting or wiring requirements. Accordingly, the primary object of this invention is to provide an improved array of toroidal cores.

DESCRIPTION OF THE PREFERRED EMBODIMENTS

Figure 1:
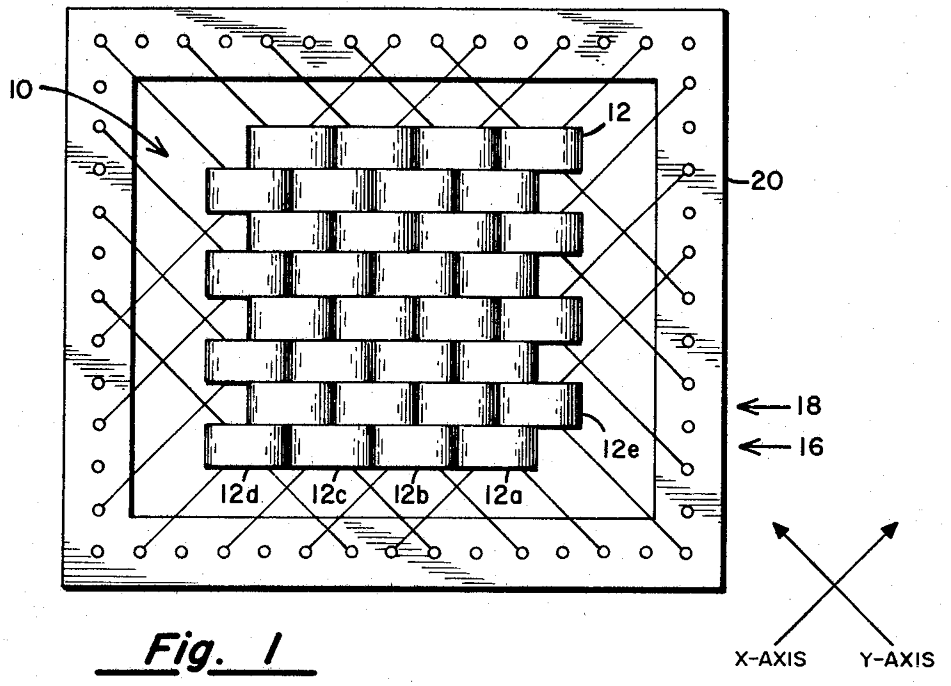
FIG. 1 is a plan view of a two-dimensional array of toroidal ferrite cores arranged according to the present invention.
Figure 2:
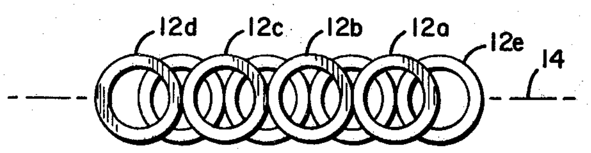
FIG. 2 is a view of the two-dimensional array of FIG. 1 taken normal to the plane of the toroidal ferrite core array.

With particular reference to FIG. 1 there is illustrated a plan view of an eight by four two-dimensional array 10 of 32 toroidal ferrite cores 12. Cores 12 are formed in a plurality of strips of planar aligned cores that are aligned in contact along their colinear diameters. With particular reference to FIG. 2 there are illustrated cores **12*a*, 12*b*, 12*c*, and 12*d* all aligned along colinear diameter 14 with their planes, e.g., the planes of their planar faces, aligned in a common plane. Adjacent strips, such as strips 16 and 18 are shifted one half of the core's outside diameter with respect to each other whereby there is provided a plurality of core stringing channels along orthogonally oriented X and Y drive axes. Array 10 could be held in frame 20** by the X and Y drive lines strung along associated axes.

Figure 3:
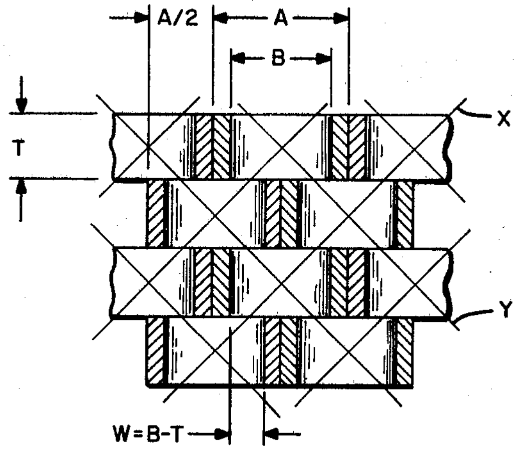
FIG. 3 is an illustration of an enlarged sectional view of a portion of the array of FIG. 1 illustrating the respective dimensions of the toroidal ferrite cores and the diagonal core stringing channels formed thereby.

With particular reference to FIG. 3 there is presented an enlarged cross-sectional view of a portion of array 10 of FIG. 1 for purposes of illustrating the respective dimensions and orientations of the cores of array 10. To synthesize a monolithic structure, such as a multi-aperture ferrite plate, it is required that the discrete cores be "close packed" and provide a continuous core stringing channel along both diagonals X and Y through the cores' inside diameters. This illustration of a cross-section of such a structure demonstrates the geometric relationships that must be satisfied to provide such a structure. The core's outside diameter is equal to the letter A, the core's inside diameter is equal to the letter B, while the core's thickness is represented by the letter T. By shifting adjacent strips of cores one half the core's outside diameter, or $A/2$, there is provided a diagonal window W equal to $B-T$.

As an example of the above relationships, two different cores C1 and C2 having the noted dimensions provide the noted diagonal window W.

CORES

| C1 | C2 | Dim. |
|---|---|---|
| .030 | .020 | A |
| .018 | .012 | B |
| .015 | .010 | T |
| .003 | .002 | W |

The applicant has calculated that the "packing density" of the illustrated embodiment of FIG. 1 is equal to $2/A^3$ cores per cubic inch while conventional arrays have been determined to have packing densities of $1/2A^3$ cores per cubic inch providing an improved packing density ratio of 1 to 4. Because discrete toroidal cores are advantageously utilized for coincident-current, i.e., bit-organized organization the present invention is particularly adaptable to the well known 2½D coincident-current memory system, which system is particularly adaptable to mass storage devices. Further, as the thickness T of the core may be increased for the cores of the present invention a thinner wall, i.e., larger inner diameter B with respect to the outer diameter A, is possible than in prior art core arrangements. This utilization of a core having a thinner wall provides greater operating margins resulting in reduced delta noise from half-select signals of coincident-current memories.

Figure 4:
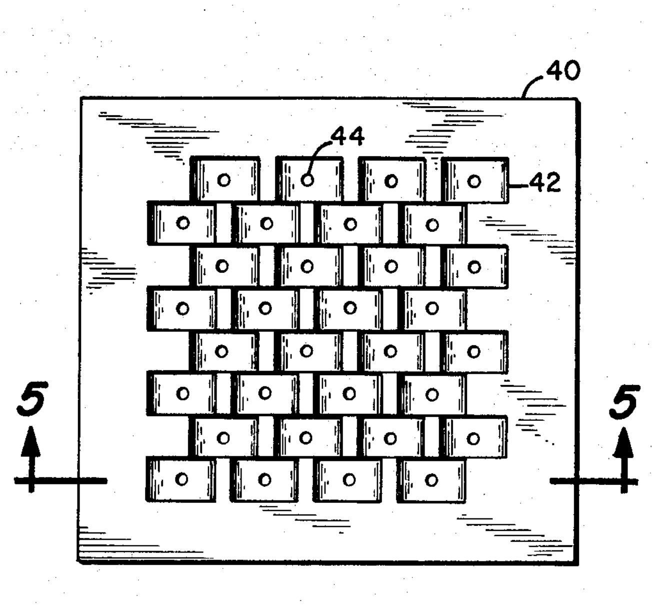
FIG. 4 is an illustration of a plan view of a core nest that may be utilized to assemble the cores in the two-dimensional array of FIG. 1.
Figure 5:
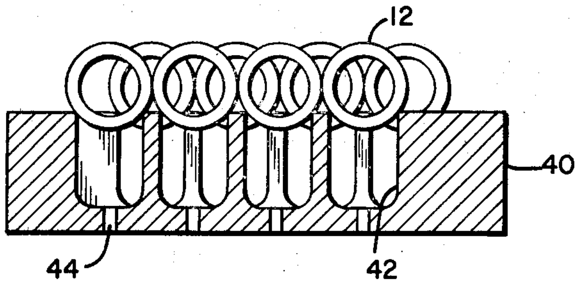
FIG. 5 is a sectional view of the core nest of FIG. 4 taken along line 5—5.

With particular reference to FIG. 4 there is presented a plan view of a core nest 40 having an irregular cavity 42 therein specifically designed to perform the core nesting function for the two-dimensional array 10 of FIG. 1. Core nest 40 may be manufactured in any one of a plurality of well known techniques such as the chemical machining technique of the copending application of A. R. Hanson et al., Ser. No. 518,060, filed Jan. 3, 1966, now Patent No. 3,421,865 and assigned to Sperry Rand Corp., as in the present invention. Core nest 40 has in the bottom of cavity 42 a plurality of apertures 44 passing through to the bottom surface providing access for the vacuum source to cavity 42 as is well known in the art. With particular reference to FIG. 5 there is presented a cross-section of core nest 40 taken along line 5—5 of FIG. 4 for the purpose of illustrating the nature of cavity 42 and apertures 44 along with the orientation of a plurality of cores 12.

It is apparent that there has been disclosed and discussed herein a preferred embodiment of applicant's invention that provides a novel, compact assembly of a plurality of toroidal cores for providing an improved packing density over that achieved by prior art arrangements. Having now, therefore, fully illustrated and described by invention what I claim to be new and desire to protect by Letters Patent is set forth in the appended claims.

1. A synthetic monolithic ferrite array, comprising:

a plurality of toroidal cores, each core having an outside diameter A, an inside diameter B, and a thickness T, where T is approximately equal to one half of A;

said cores arranged in a plurality of strips, each of said strips including a plurality of planar aligned cores that are aligned in contact along their colinear diameters;

said strips arranged with their colinear diameters in a common plane with adjacent strips having their cores' planar faces in contact and shifted out of alignment one half of A with respect to adjacent planar faces of cores of adjacent strips.

2. The array of claim 1 wherein the shifted adjacent strips form diagonal windows W equal to approximately B minus T for forming diagonal core stringing channels along two different coplanar axes.

3. The array of claim 2 wherein said two different core stringing channels are aligned along sets of orthogonal, coplanar axes.

4. The array of claim 3 further including sets of X axis and Y axis conductors strung through their respective different axes.

5. The array of claim 4 further including a core stringing frame to which said X axis and Y axis conductors are coupled for supporting said array therein.

6. The array of claim 5 wherein B is approximately equal to 0.6 A. or greater.

7. A synthetic monolithic ferrite array comprising:

a plurality of similar toroidal ferrite cores;

said cores arranged in a plurality of strips, each of said strips including a plurality of planar aligned cores that are aligned in contact along their colinear diameters;

said strips arranged with their colinear diameters in a common plane with adjacent strips having their cores' planar faces in contact and shifted out of alignment one half of the outside diameter of said cores with respect to adjacent planar faces of cores of adjacent strips.

8. The array of claim 7 wherein the inside diameters of the cores of the shifted adjacent strips form diagonal windows therethrough for forming diagonal core stringing channels.

9. The array of claim 8 wherein said diagonal core stringing chanels are aligned along orthogonal sets of coplanar axes.

References Cited

UNITED STATES PATENTS

| | | | |
|---|---|---|---|
| 3,155,942 | 11/1964 | Hoover | 340—174 |
| 3,230,610 | 1/1966 | Gutwin et al. | 340—174 XR |

JAMES W. MOFFITT, Primary Examiner

G. M. HOFFMAN, Assistant Examiner